Sept. 24, 1929.   F. KADE   1,729,345

REPULSION INDUCTION MOTOR

Filed March 26, 1924

Patented Sept. 24, 1929

1,729,345

UNITED STATES PATENT OFFICE

FRIEDRICH KADE, OF KIEL, GERMANY, ASSIGNOR TO DEUTSCHE WERKE KIEL AKTIENGESELLSCHAFT, OF KIEL, GERMANY, A GERMAN CORPORATION

REPULSION INDUCTION MOTOR

Application filed March 26, 1924, Serial No. 702,159, and in Germany May 18, 1923.

This invention relates to a compensated alternating current commutator-motor and more especially to a motor of this class which is called a repulsion-induction motor, that is a motor which is started as repulsion motor and normally operated as induction motor.

Asynchronous or induction motors of the single-phase type, as known, will not be able to develop a torque at starting when normally connected, the torque during normal operation being due to the rotary magnetic field, which is generated in the primary member by the mechanical rotation of the motor. In order to start a single phase induction motor, therefore, an auxiliary phase-winding may be provided on the motor, said winding being supplied with current which, by means of choke coils or similar devices, is caused to have a time-phase displacement relatively to the current of the main phase-winding. The motor will thus start as "split-phase" induction motor and after attaining normal speed, the auxiliary phase-winding may be disconnected. The torque which is developed by such a split-phase motor, however, is only small at starting, and its power-factor during normal operation is several percent smaller than that of a polyphase motor of corresponding construction.

The disadvantages of the split-phase motor are avoided by the repulsion-induction motor such as, for instance, described in the U. S. patent to Arnold No. 562,365. According to this patent, the motor is providing with a commutator with brushes properly placed thereon and closed upon each other, whereby the motor will start as single-phase repulsion-motor, developing a strong torque at starting. After reaching normal speed, the commutator may be short-circuited, if desired by a centrifugal device, and eventually the brushes may be lifted so that the motor will operate normally as single-phase induction motor.

My present invention has for its object primarily to avoid the rather complicated short-circuiting device which is ordinarily employed for shortcircuiting the commutator at normal speed; by my invention furthermore I secure a compensation of the motor so that a high power factor will be the result.

Figure 1:
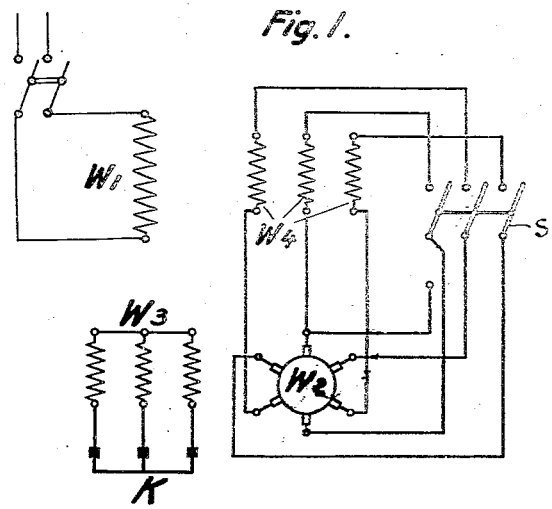
Figure 2:
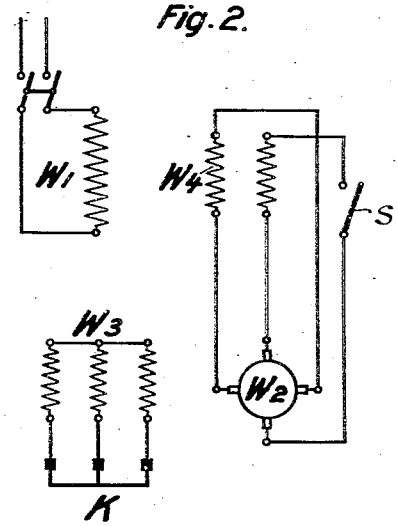

My invention will be more fully understood by reference to the accompanying drawing, of which Fig. 1 shows a diagrammatic view of one form of my motor according to this invention and Fig. 2 similarly a modification of the arrangement of Fig. 1.

On the stator of the motor there is mounted a single-phase primary or main winding $w_1$ and a winding on the rotor, said latter winding ending in a commutator $w_2$. Furthermore on the rotor, preferably in the same slots with the commutator-winding there is mounted a further polyphase winding $w_3$ which is provided with shortcircuiting contacts $k$. At starting a pair of brushes which are displaced from each other by 180 electrical degrees and set in a proper angle to the axis of primary magnetization, is closed or shortcircuited by throwing the switch $s$ in its lower position, so that the repulsion-motor brushes are connected with each other. The motor will now start as a repulsion motor with a strong starting torque. After attaining normal speed, the winding $w_3$ is shortcircuited, thereupon the shortcircuit of the repulsion-motor brushes is opened and the commutator-winding $w_2$ connected with an auxiliary winding $w_4$ on the stator which may be a single or polyphase winding. The brushes are so displaced that the current flowing from the winding $w_4$ into the commutator will take care of the excitation of the rotary field within the motor. The alternating current line will therefore no more furnish the wattless or exciting current and the power factor of the motor becomes very high and may attain the value of unity at proper load of the motor.

The connection for the motor may also be changed by keeping the brushes, which carry current at starting, always in their operating condition relatively to the stator-winding and—in case of a polyphase arrangement of the auxiliary circuit—by properly connecting the phases which during starting are inoperative, when changing over to the connections for normal operation as indicated in Fig. 2 of the drawing. By this the switching instrumentalities will be simplified and their number reduced.

Having thus described my invention, I desire to secure by Letters Patent of the United States:

1. A single phase alternating current motor adapted for starting as a repulsion motor and for running as a compensated induction motor, comprising a single phase primary stator winding, a polyphase exciting winding on the stator, a secondary phase winding on the rotor, means for open circuiting and short circuiting said secondary phase during starting and running, respectively, a commutator on the rotor, a winding on the rotor, connected to said commutator, a plurality of pairs of commutator brushes, a circuit connecting one pair of said brushes, a circuit for respectively connecting together each brush pair through one phase of said exciting winding, means for simultaneously closing said first named circuit and for opening said second named circuit during starting and for simultaneously opening said first named circuit and for closing said second named circuit during running.

2. A single phase alternating current motor adapted for starting as a repulsion motor and for running as a compensated induction motor, comprising a single phase primary stator winding, a polyphase exciting winding on the stator, a secondary phase winding on the rotor, means for open circuiting and short circuiting said secondary phase during starting and running, respectively, a commutator on the rotor, a winding on the rotor connected to said commutator, a plurality of pairs of commutator brushes, the brushes of one pair being short circuited and the brushes of the other pairs being disconnected during starting, and each of said brush pairs being connected with one phase of said exciting winding during running.

In testimony whereof I have hereunto affixed my signature.

FRIEDRICH KADE.